INVENTORS
VIRGIL E. GEX,
BY ABRAHAM BART,

*Allen & Allen*

ATTORNEYS

United States Patent Office 3,054,441
Patented Sept. 18, 1962

3,054,441
HOT WIRE CUT-OFF
Virgil E. Gex, Wyoming, and Abraham Bart, Hamilton County, Ohio (both % Procter and Gamble Co., Ivorydale Tech. Center, Cincinnati 17, Ohio)
Filed Sept. 29, 1960, Ser. No. 59,228
4 Claims. (Cl. 156—515)

This invention has to do with the packaging of materials in thermoplastic films. The art offers a number of ways of enclosing individual articles, or granular or other materials in packets formed of film-like substances. In a typical operation the material in measured amounts is enclosed between folded layers or separate strips of the film substance in a continuous operation in which the film layers or strips are sealed to each other both longitudinally and transversely at intervals whereby to form a succession of packets which must be severed from each other along lateral lines of cleavage. In many instances a plurality of packets are formed abreast, so that the packets must be severed from each other longitudinally also.

The formation of longitudinal lines of severance does not present a serious problem because it may be accomplished by stationary sharp blades during the travel of the packet composite. The formation of transverse lines of severance, however, is much more difficult. The provision of devices which will make a shear cut transversely of the moving composite is complicated and expensive. Where the packet composite is moving in contact with a supporting member, transverse cut-off devices involving a blade operating against an anvil have been employed; but these are difficult to maintain in an operating condition such that a positive transverse cut is assured. It has hitherto been suggested that, where the packets are formed from thermoplastic films a heated member may be employed to sever the packets from each other transversely of the composite. The severance of packets in this way has not hitherto been successful in situations where the packet edge being severed cannot be pulled away from the succeeding packet edge as the cut is made. It is necessary for severance to heat the sealed composite films to a temperature such that the substance of the films essentially liquefies. In prior attempts where the packets remain in the pockets of a drum and hence cannot be moved with respect to each other, the substantially liquid portions of the films have tended to adhere to operating instrumentalities, have tended to produce stringing, and have also tended to re-seal to each other upon the removal of the heated member.

The primary object of this invention is to provide a means and method for severing from each other packets made from thermoplastic films, the severance being accomplished through the use of heated members, but without the disadvantages above noted.

Although the manner in which the packet composite is formed does not constitute a limitation on this invention, for the sake of an exemplary showing, the invention will be described in connection with a packaging method in which a first thermoplastic film of stretchable character is led onto the surface of a moving member characterized by depressions forming pockets separated by lands. Provision is made for the application of vacuum to the bases of the pockets in the moving member and, thermoplastic film strip being softened, it is drawn into the pockets so as to form recesses in the film for the reception of the material to be packaged. These recesses are then filled, after which a second thermoplastic film strip in undistorted condition is led onto the moving member and sealed to the first film strip on the lands of the moving member. For the details of a mechanism suitable for carrying on this packaging process, reference is made to the copending application of Virgil E. Gex and Robert L. Kramer entitled, Sealing Soluble Film Packets, Serial No. 61,509, filed October 10, 1960 and assigned to the same assignee. The Gex et al. mechanism was designed primarily for the packaging of measured quantities of a detergent or like substance in granular form in packets made of water-soluble films such as films of polyvinyl alcohol, polyvinyl alcohol derivates, soluble films of cellulosic origin, and the like. The completed packets are suitable for introduction into water in a washing machine, dishpan, or the like without previous opening of the packets, since the substance of the films is completely soluble in the water. The present invention is not limited to the use of water-soluble films but will serve very well with any form of thermoplastic film including polyethylene, polystyrene, chlorinated rubber, polyester films and the like.

The principal object of the invention which has been set forth above, and other objects which will be set forth hereinafter or which will be clear to the skilled worker in the art upon reading these specifications are accomplished by that procedure and by that construction and arrangement of parts of which the aforesaid exemplary embodiment will now be described. Reference is made to the accompanying drawings wherein.

Briefly, in the practice of the invention, it has been found that severance of the packets from each other by heat can be successfully accomplished if a recess is provided in the moving member beneath the line of cut, if a heated member is supported at the apex of a wedge of refractory insulating material, and if the heated member and an end of the wedge is passed entirely through the films to be severed so as to extend into the recess. Under these circumstances the films are severed by melting; but the heated element passes through the films to a position below them. The severed film ends are both displaced and cooled by the ceramic material of the wedge end, to which the film substance will not adhere. Thus stringing is prevented, there is no rewelding of the hot film edges, and a return path is provided for the heated element out of contact with the film edges.

Figure 1:
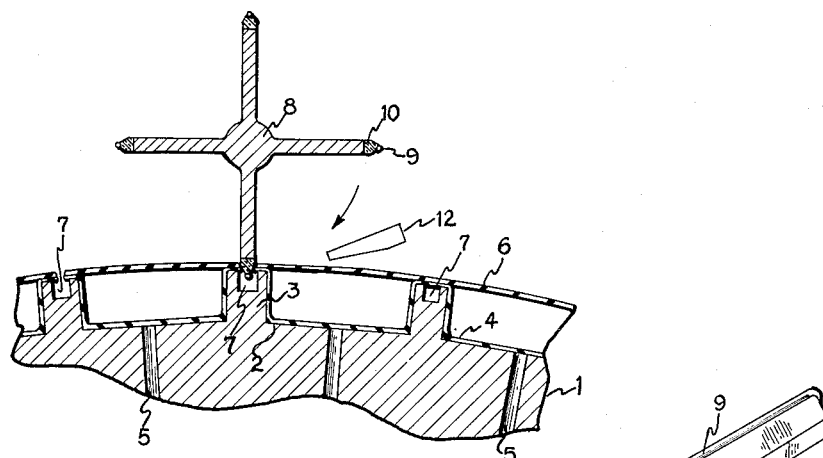
FIGURE 1 is a longitudinal sectional view showing a portion of a pocketed moving member carrying sealed packets and a cut-off device in accordance with this invention.
Figure 2:
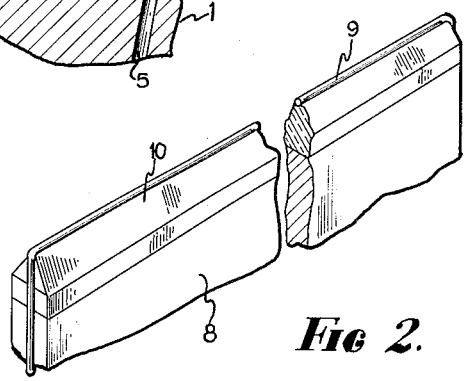
FIG. 2 is a partial perspective view of the operative portion of the cut-off device.

Referring to FIG. 1, a moving element is indicated at 1 having pockets 2 separated by transverse lands 3. It will be understood that the moving member 1 also has longitudinal lands. A first thermoplastic film 4 has been drawn down into the pockets 2 by vacuum, the pockets having connection with a vacuum source through suitable openings 5 in the moving member. The pockets in the first thermoplastic film 4 will have been filled with the desired material for packaging, and a second thermoplastic film 6 will have been led onto the moving member and will have been sealed to the first film 4 on the lands. In this way a packet composite will have been formed in which the individual packets are sealed around all four edges but remain in connection with each other.

In the practice of this invention the lands upon which the cutting is to be done are provided with recesses 7 underlying the proposed line of cut. A second moving member 8 is provided to carry the heated elements which are to do the cutting. The member 8 has been illustrated in the form of a spider; but the skilled worker in the art will understand that it may take other forms. The member 8 will be driven synchronously with the member 1 so as to present a heated cutting element to each of the transverse lands. Synchronous driving means have not been illustrated but are well within the skill of the worker in the art. For example where the moving member 1 is a drum having a shaft, and is driven by a suitable prime mover, the drum shaft may be connected to the shaft of the member 8 by a gear drive, or a chain and sprocket drive, or the like.

The heated element is preferably in the form of a resistive metallic wire or strip 9, which may be heated and controlled as to temperature by the application of electric current. The heated element is supported by a refractory wedge 10 which in turn is supported upon the body of the member 8. The wedge will be formed from any suitable heat resisting material which will not soften at the temperature maintained in the wire 9. The wedge may be made of glass, porcelain, ceramics, or other refractory material such as Pyroceram made by the Corning Glass Company. The wedge should have the characteristics of electrical insulation and a low heat transmissivity. Preferably the surface of the wedge will be glazed, i.e. smooth and non-porous. The apex of the wedge will be flattened or slightly concaved to form a seat for the wire, but it is not necessary that the wire lie tightly against the apex of the wedge. A slight separation is permissible.

In the illustrated embodiment, the member 8 has been shown as having four arms, each provided with a wedge and a hot wire. Where the wire traverses any metallic part of the body of the member 8 it will be insulated as at 11 in FIGURE 3. The ends of the several wire elements may be attached to rings or commutator devices to which electrical contact is made by means of brushes as will be understood by the skilled worker. The wire elements may be arranged to be heated at all times during the operation of the machine, or they may be arranged to be heated for only a part of the travel of the member 8. In any event, at the time the actual cutting is done, the wires will be maintained at a high enough temperature to melt the thermoplastic substance of the films. Since the required temperature may be in the neighborhood of red heat, the wire will be made of a substance such as Nichrome which is resistant to oxidation.

Figure 3:
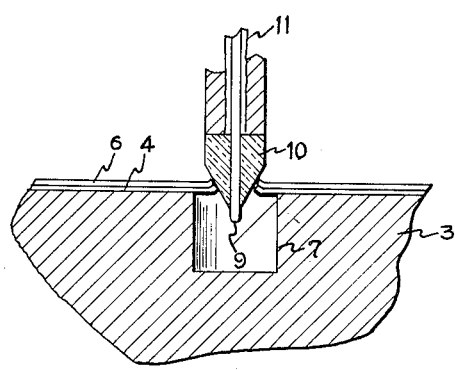
FIG. 3 is a partial end elevation of the moving member and the cut-off device, showing the latter in its final position after the severance of the films.

As most clearly shown in FIGURE 3 the motion of the described parts is such that in the severing operation the wire 9 in heated condition will be brought against the sealed films 4 and 6 so as to melt the film substance, after which the wire will pass entirely through the films entering the recess 7 along with the tip portion of the wedge 10. The inclined sides of the wedge displace the severed edges of the films causing a gap to form between them and also cooling and solidifying the film edges. The gap prevents the rewelding of the films and provides a return path for the hot wire.

It will be understood that the wedge and wire are made long enough to extend entirely across the face of the moving member 1. While it has not been found necessary in ordinary practice, a blast of cooling gas such as air may be directed toward the line of severance through one or more nozzles 12 and may assist in the rapid cooling of the severed film edges. The apparatus and method has been described in connection with the formation of transverse lines of severance in packet composites, but it will be understood by the skilled worker in the art that the same principles may be applied to the formation of longitudinal lines of severance.

Modifications may be made in the invention without departing from the spirit of it. The invention having been described in an exemplary embodiment, what is claimed as new and desired to be secured by Letters Patent is:

1. Apparatus for severing sealed packets from each other in a packet composite comprising a moving support for the packet composite including supporting means for the seals thereof, said last mentioned supporting means having a recess beneath the proposed line of severance, and a second moving member having a refractory wedge with a heated element at its apex, the line of movement of the refractory wedge and heated element intersecting the line of movement of the supporting means so that said heated element and a portion at least of said refractory wedge will pass through said packet composite and into said recess whereby said wedge will form a gap between the severed edges of said packet composite to permit withdrawal of said heated element.

2. Apparatus for the purpose described comprising a first rotating element for supporting a packet composite consisting of a plurality of packets made of thermoplastic film with seals between packets, said element being characterized by recesses underlying said seals, and a second rotating element having a heated element supported by a refractory wedge and having a mode of motion with respect to the first rotary element such that the heated element and a portion of said wedge will pass through the seal of said packet composite, severing the thermoplastic material in said seal and forming a gap between the severed edges of said packet composite through which said heated element may be withdrawn during a continuance of the motion of said second rotating element.

3. The structure claimed in claim 2 including means for blowing a cooling gas on the packet compostie at the line of severance.

4. The structure claimed in claim 2 in which said first mentioned rotative element is a drum characterized by pockets and intermediate lands, in which the film portions of said packet composite are sealed together on said lands, and in which said recesses are formed intermediate the edges of said lands.

References Cited in the file of this patent

UNITED STATES PATENTS

| | | |
|---|---|---|
| 2,185,647 | Penn | Jan. 2, 1940 |
| 2,627,893 | Williams | Feb. 10, 1953 |

FOREIGN PATENTS

| | | |
|---|---|---|
| 21,005 | Great Britain | 1904 |

UNITED STATES PATENT OFFICE
CERTIFICATE OF CORRECTION

Patent No. 3,054,441 September 18, 1962

Virgil E. Gex et al.

It is hereby certified that error appears in the above numbered patent requiring correction and that the said Letters Patent should read as corrected below.

In the grant, lines 1 and 2, for "Virgil E. Gex, of Wyoming, and Abraham Bart, of Hamilton County, Ohio," read -- Virgil E. Gex, of Wyoming, and Abraham Bart, of Hamilton County, Ohio, assignors to The Procter & Gamble Company, of Cincinnati, Ohio, a corporation of Ohio, --; line 11, for "Virgil E. Gex and Abraham Bart, their heirs" read -- The Procter & Gamble Company, its successors --; in the heading to the printed specification, lines 3 to 5, for "Virgil E. Gex, Wyoming, and Abraham Bart, Hamilton County, Ohio (both % Procter and Gamble Co., Ivorydale Tech. Center, Cincinnati 17, Ohio)" read -- Virgil E. Gex, Wyoming, and Abraham Bart, Hamilton County, Ohio, assignors to The Procter & Gamble Company, Cincinnati, Ohio, a corporation of Ohio --; column 4, line 42, for "compostie" read -- composite --.

Signed and sealed this 19th day of February 1963.

(SEAL)
Attest:

ESTON G. JOHNSON
Attesting Officer

DAVID L. LADD
Commissioner of Patents